Dec. 29, 1959   J. W. DAVIS   2,918,990
DISC BRAKES FOR VEHICLES
Filed Aug. 17, 1956   4 Sheets-Sheet 1
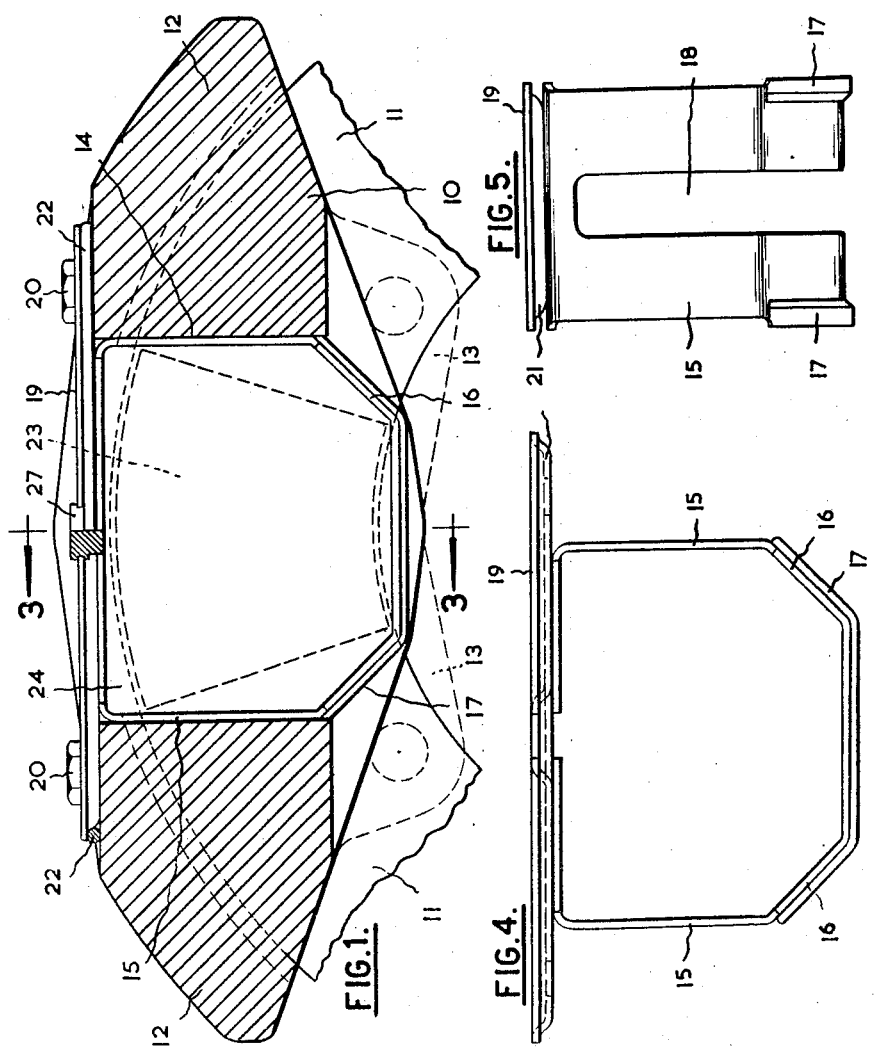

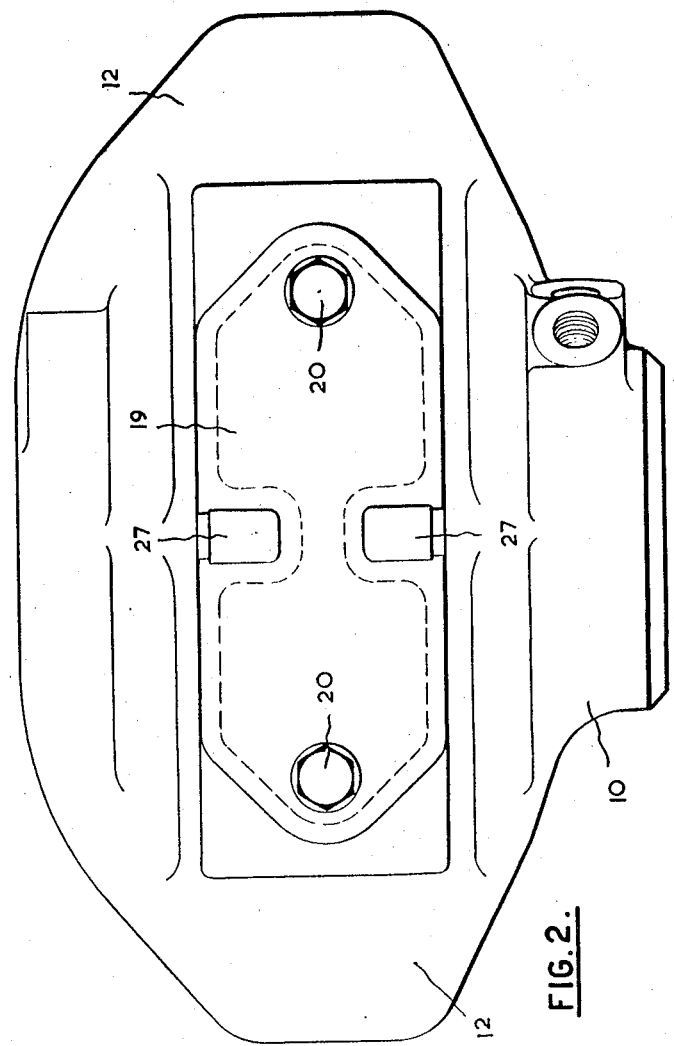

Dec. 29, 1959  J. W. DAVIS  2,918,990
DISC BRAKES FOR VEHICLES
Filed Aug. 17, 1956  4 Sheets-Sheet 3
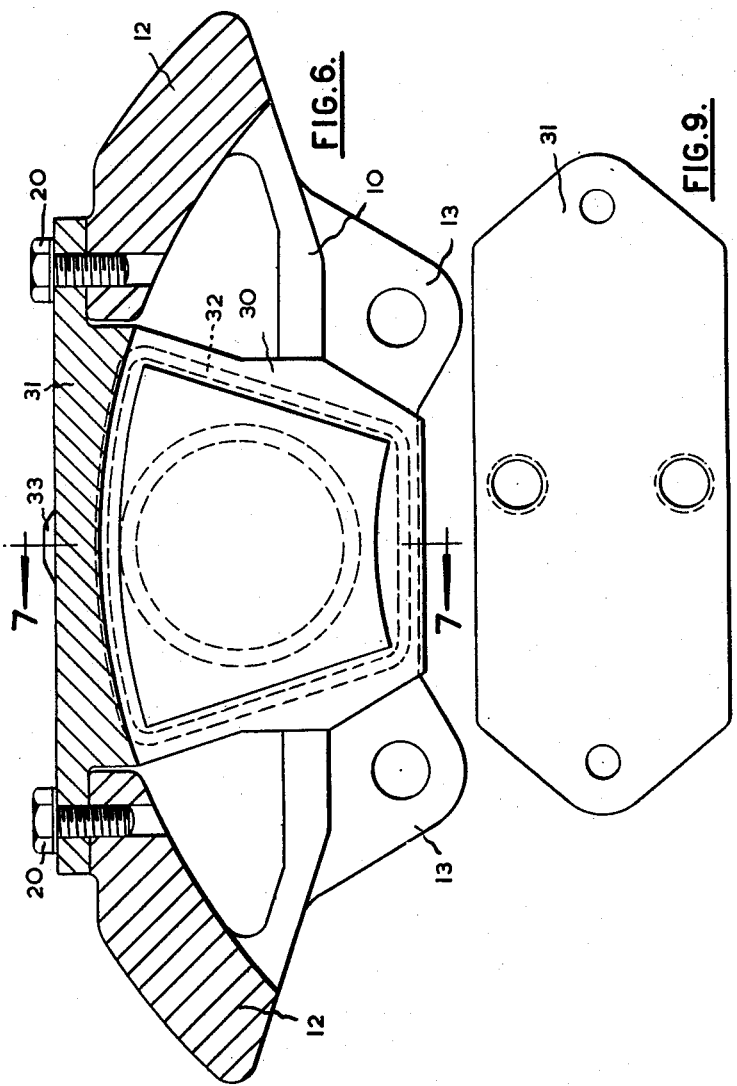
Inventor
John Walter Davis
By: Scrivener and Parker
attorneys

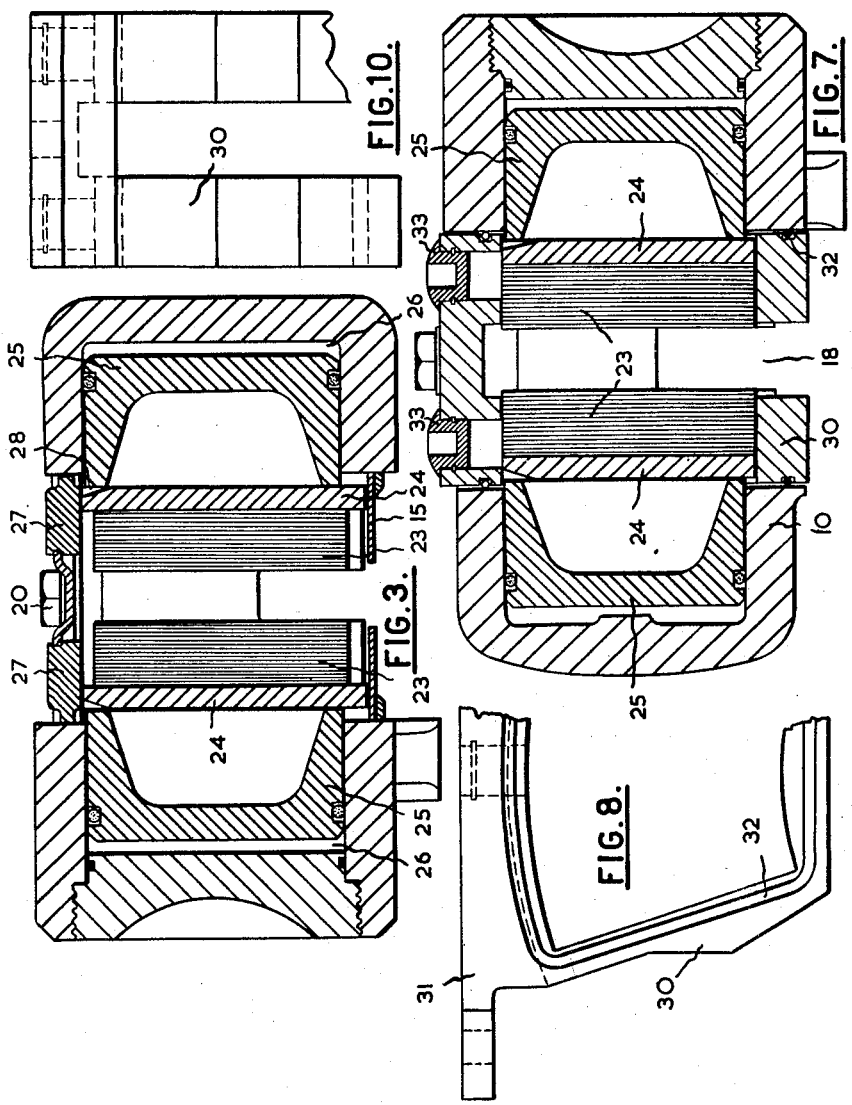

United States Patent Office 2,918,990
Patented Dec. 29, 1959

2,918,990

DISC BRAKES FOR VEHICLES

John Walter Davis, Rubery, Rednal, Birmingham, England, assignor to Girling Limited, Birmingham, England, a British company Application August 17, 1956, Serial No. 604,797

Claims priority, application Great Britain August 19, 1955

8 Claims. (Cl. 188—73)

This invention relates to disc brakes for vehicles, of the kind in which friction pads are adapted to be urged into engagement with opposite faces of a disc rotating with a wheel or other rotating member by pistons working in opposed hydraulic cylinders in a rigid stationary caliper which straddles a portion of the periphery of the disc.

In the specification of United States patent application Serial No. 544,338, filed November 1, 1955, there has been described a disc brake of that kind in which the radially outermost side of the caliper is open over a sufficient circumferential length to permit the insertion and removal of the pads through the opening.

One of the objects of the present invention is to improve the construction of such a brake in order to facilitate the maintenance of the brake and the replacement of worn friction pads.

According to the invention, in a disc brake in which the friction pads can be inserted and removed through an opening in the radially outmost side of the caliper the friction pads with their backing plates are mounted in a housing with which they form a unit which is adapted to be inserted into and removed from the caliper to which the housing is detachably secured.

Thus when the friction pads are worn out the housing can be removed and another equipped with new pads inserted so that maintenance of the brake in effective working order is extremely simple. Preferably the outer end of the housing is formed by a cover plate which fits over the opening in the caliper and is provided with a rubber or other sealing means for excluding water and dirt from the friction pads. A seal may also be provided between the inner end of the housing and the caliper on each side of it.

The friction pads are applied by pistons in the opposed hydraulic cylinders in the caliper, the pistons engaging the backing plates of the friction pads, and as the friction pads wear the pistons advance into the housing. Openings normally closed by rubber plugs or the like are conveniently provided in the cover plate through which a screw-driver blade or other tool can be inserted to push the pistons back into the cylinders when it is desired to remove the housing with the worn friction pads.

The backing plates of the friction pads are preferably a sliding fit in the housing which is itself a sliding fit into the caliper so that when the brake is applied the torque on the friction pads is taken through the housing by the caliper.

Two practical embodiments of the invention are illustrated by way of example in the accompanying drawings, in which:

Figure 1 is a section in the plane of the brake disc of a brake caliper embodying the invention;

Figure 2 is a plan of the caliper;

Figure 3 is a transverse section on the line 3—3 of Figure 1;

Figure 4 is a side elevation of the brake pad housing by itself;

Figure 5 is an end elevation of the brake pad housing;

Figure 6 is a section similar to Figure 1 showing an alternative construction for the brake pad housing;

Figure 7 is a transverse section on the line 7—7 of Figure 6;

Figure 8 is a fragmentary side elevation of the brake pad housing by itself;

Figure 9 is a plan of the brake pad housing; and

Figure 10 is an end elevation of the brake pad housing.

In the embodiment illustrated in Figures 1 to 5 the caliper 10 is a one-piece forging or casting and comprises two block portions of roughly triangular outline adapted to lie on opposite sides of the brake disc 11 with integral connecting portions 12 at each end lying outside the periphery of the brake disc. One of the block portions is provided with inwardly extending lugs 13 to receive bolts for securing the caliper to a stationary member adjacent to the brake disc.

An opening 14 of rectangular cross-section extends radially through the caliper to receive the removable housing 15 for the brake pads.

This housing is a skeleton rectangular frame of such dimensions that it is a push or slide fit in the opening 14, the inner corners 16 of the housing being inclined at about 45° as shown in Figure 1 to facilitate the entrance of the housing into the opening.

Rubber sealing strips 17 are bonded to the inner edges of the housing on each side to make a water- and dust-proof seal with the adjacent portions of the caliper.

The inner end and side walls of the housing are slotted as shown at 18 in Figure 5 to clear the brake disc, the width of the slot being only slightly greater than the thickness of the disc.

The outer end of the housing is welded or otherwise secured to a rigid cover-plate 19 which is extended at each end to receive screws 20 which are screwed into tapped holes in the outer face of the caliper to secure the housing in position. The cover plate is conveniently formed as a sheet metal pressing and is shaped around its periphery as shown at 21 to receive a rubber sealing member 22 which seats against a flat machined surface on the caliper around the outer end of the opening.

The friction pads 23, which are of segmental outline are bonded to rigid steel backing plates 24 which are of such outline and dimensions as to be a sliding fit in the housing. The friction pads are applied to opposite faces of the brake disc by pistons 25 working in opposed hydraulic cylinders 26 in the block portions of the caliper.

The backing plates 24 are a sliding fit in the housing 15 which is itself a sliding fit in the opening 14 in the caliper so that when the brake is applied the torque on the pads is taken through the housing by the caliper which is bolted to a stationary part of the vehicle.

When the pads have been worn to a minimum thickness the complete housing is withdrawn through the outer end of the opening 14 after removal of the screws 20 and another housing with new pads is inserted or new pads are fitted to the same housing which is then replaced.

As the friction pads wear the pistons advance into the housing and opposed notches normally closed by rubber plugs 27 are conveniently provided in the cover plate 19 through which a screw-driver blade or other tool can be inserted to push the pistons back into the cylinders when it is desired to remove the housing with the worn pads. The plugs 27 may be formed by integral thickened portions of the rubber seal 22. Notches 28 may be provided in the outer faces of the backing plates to facilitate the engagement of the tool with the inner ends of the pistons.

In the modified construction shown in Figures 6 to 10 the housing 30 is a die-casting with an integral cover plate 31. The housing in side elevation has the external outline shown more particularly in Figures 6 and 8, the radial opening in the caliper being of complementary outline. The internal shape of the housing is segmental and the backing plates for the friction pads are of the same outline and are a sliding fit in the housing. The housing has flat end faces and seals are made between these faces and the adjacent faces of the opening in the caliper by rubber sealing members 32 of circular cross-section located in grooves in the end faces of the housing around the opening for the friction pads.

Openings closed by removable plugs 33 are provided in the cover part 31 of the housing for the insertion of a tool to push the pistons back prior to removal of the housing.

All the other parts of the caliper are the same as described above in relation to the first embodiment and the same references have been applied to corresponding parts.

I claim:

1. A disc brake for vehicles comprising a rotatable brake disc, a rigid stationary caliper straddling a portion of the periphery of the brake disc and having an opening in its radially outermost side, a housing insertable into and removable from the caliper through said opening, friction pads disposed on opposite sides of the brake disc mounted in and forming a unit with said housing, opposed hydraulic cylinders in rigid connection with the caliper, and pistons working in said cylinders for engagement with said friction pads to urge them against opposite faces of the brake disc, whereby on removal and insertion of said housing, said hydraulic cylinders and pistons remain attached to said caliper.

2. A disc brake as in claim 1, further comprising a cover plate rigid with the housing for closing said opening in the caliper, and means for detachably securing the cover plate to the caliper to retain the housing in the caliper.

3. A disc brake as in claim 1, further comprising rigid backing plates to which said friction pads are secured and which are a sliding fit in the housing which is a sliding fit in the caliper, said backing plates being engaged, when the housing is in the caliper, by the pistons in the hydraulic cylinders that are in rigid connection with the caliper.

4. A disc brake for vehicles comprising a rotatable brake disc, a rigid stationary caliper straddling a portion of the periphery of the brake disc and having an opening extending radially through it, a skeleton housing which is a sliding fit into said opening into which it is insertable from the outer end of the opening, rigid backing plates which are mounted in said housing and are a sliding fit therein, friction pads of segmental outline secured to said backing plates disposed on opposite faces of the brake disc, opposed hydraulic cylinders in rigid connection with the caliper and separate from said housing, and pistons working in said cylinders and engaging said backing plates to urge the friction pads against the disc, said piston remaining in said cylinders and said cylinders remaining in rigid connection with said caliper on removal of said housing.

5. A disc brake for vehicles as in claim 4, wherein said housing is rigid with a cover plate which closes the outer end of the opening in the caliper and is secured to the caliper by removable means.

6. A disc brake for vehicles as in claim 4, wherein means are provided on said housing for making a weathertight seal with the caliper.

7. A disc brake for vehicles as in claim 5, wherein said cover plate is provided with openings normally closed by removable plugs for the insertion of a tool to push the pistons back into the hydraulic cylinders after the friction pads have worn in order to permit removal of the housing and pads from the caliper.

8. A caliper for a disc brake comprising a caliper adapted to straddle a portion of the periphery of a brake disc and having an opening in its radially outermost side, a housing insertable into and removable from the caliper through said opening, means for detachably securing the housing to the caliper, friction pads mounted in and forming a unit with said housing, opposed hydraulic cylinders in rigid connection with the caliper, and pistons working in said cylinders for engagement with said friction pads, whereby said hydraulic cylinders and pistons remain undisturbed in said caliper on insertion and removal of said unit.

References Cited in the file of this patent

UNITED STATES PATENTS

| | | |
|---|---|---|
| 1,527,798 | Hawley | Feb. 24, 1925 |
| 2,419,113 | Bricker | Apr. 15, 1947 |
| 2,650,680 | Coombes et al. | Sept. 1, 1953 |
| 2,682,320 | Chamberlain et al. | June 29, 1954 |
| 2,754,936 | Butler | July 17, 1956 |
| 2,762,460 | Butler | Sept. 11, 1956 |
| 2,799,367 | Dotto | July 16, 1957 |

FOREIGN PATENTS

| | | |
|---|---|---|
| 711,405 | Great Britain | June 30, 1954 |